L. EHRLICH.
FABRIC MEASURING AND COST COMPUTING MACHINE.
APPLICATION FILED NOV. 12, 1918.
1,339,748. Patented May 11, 1920.
3 SHEETS—SHEET 1.
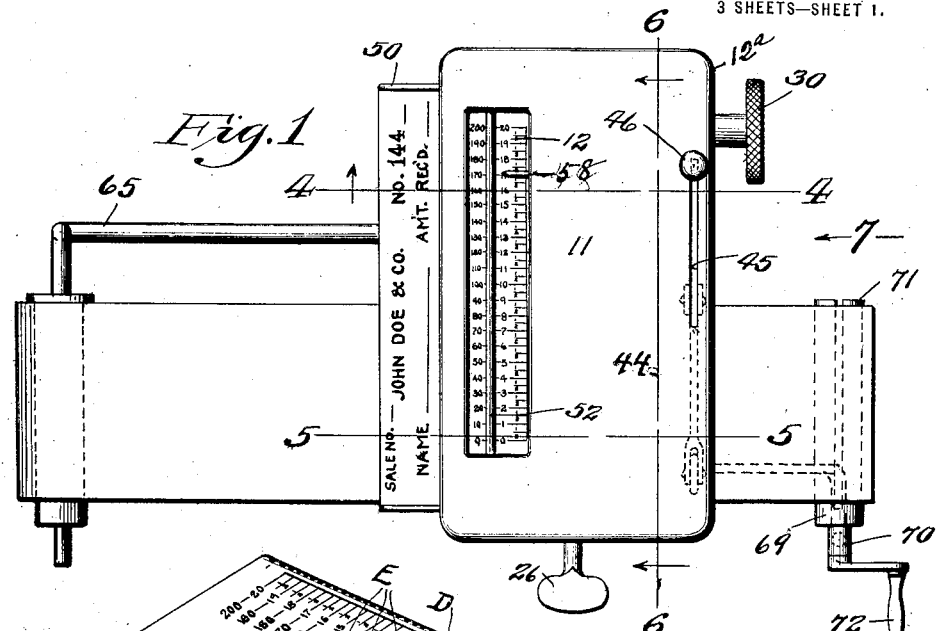
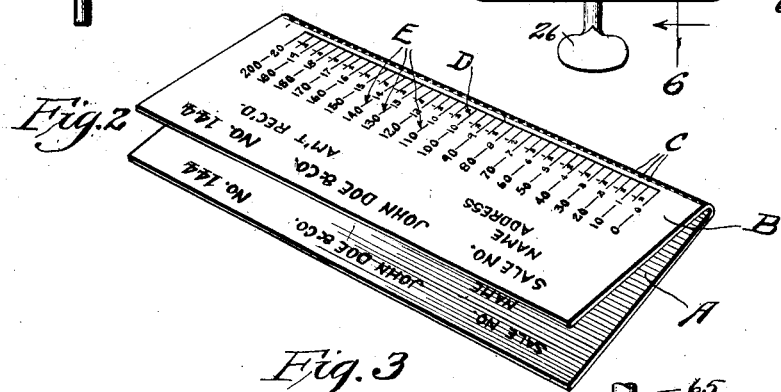
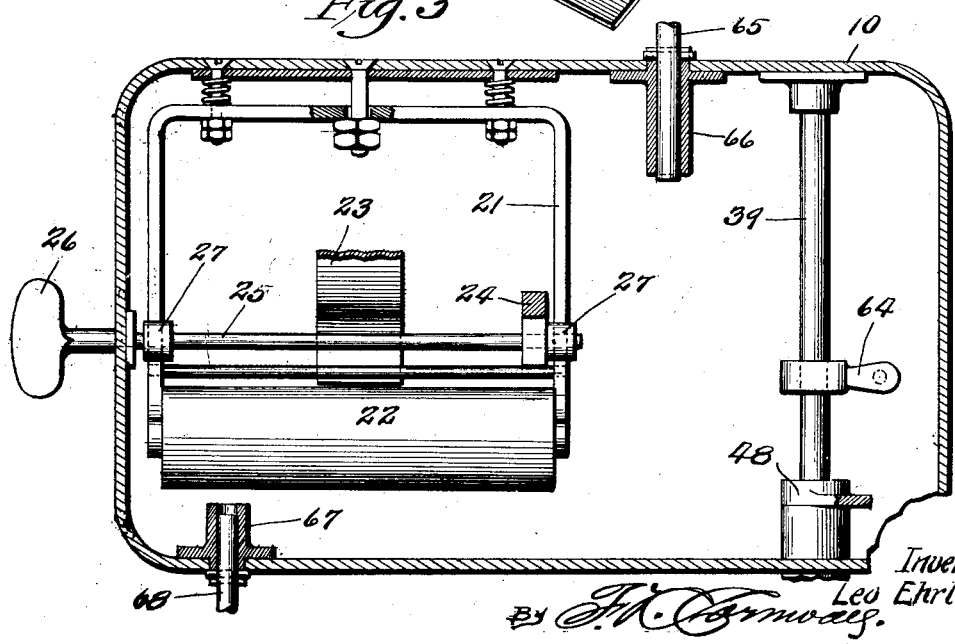
Inventor
Leo Ehrlich L. EHRLICH.
FABRIC MEASURING AND COST COMPUTING MACHINE.
APPLICATION FILED NOV. 12, 1918.
1,339,748.
Patented May 11, 1920.
3 SHEETS—SHEET 2.
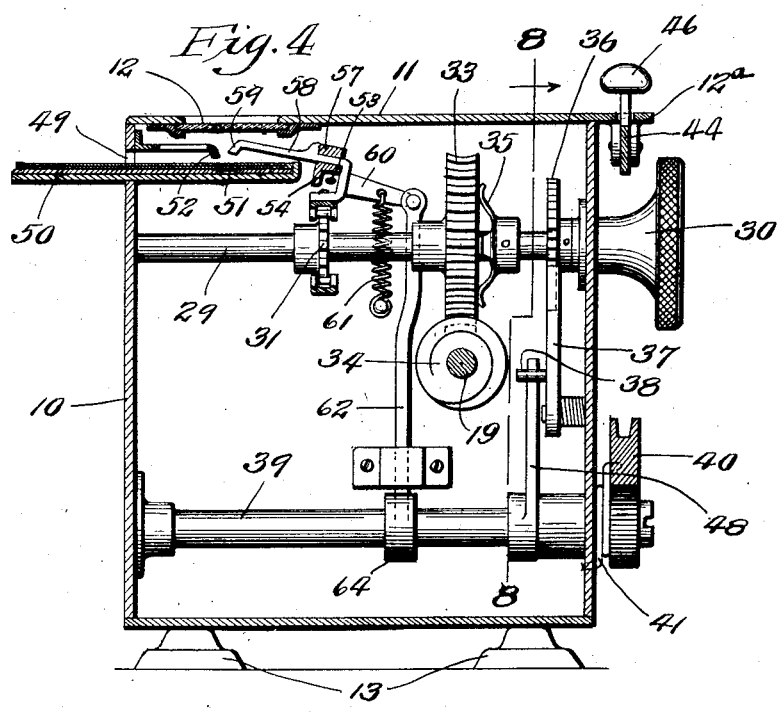
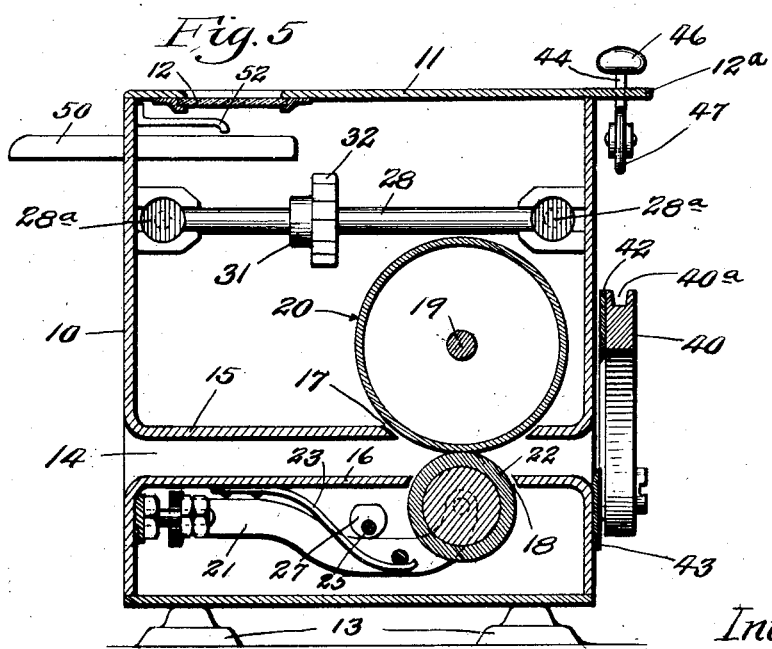

L. EHRLICH.
FABRIC MEASURING AND COST COMPUTING MACHINE.
APPLICATION FILED NOV. 12, 1918.
1,339,748.
Patented May 11, 1920.
3 SHEETS—SHEET 3.
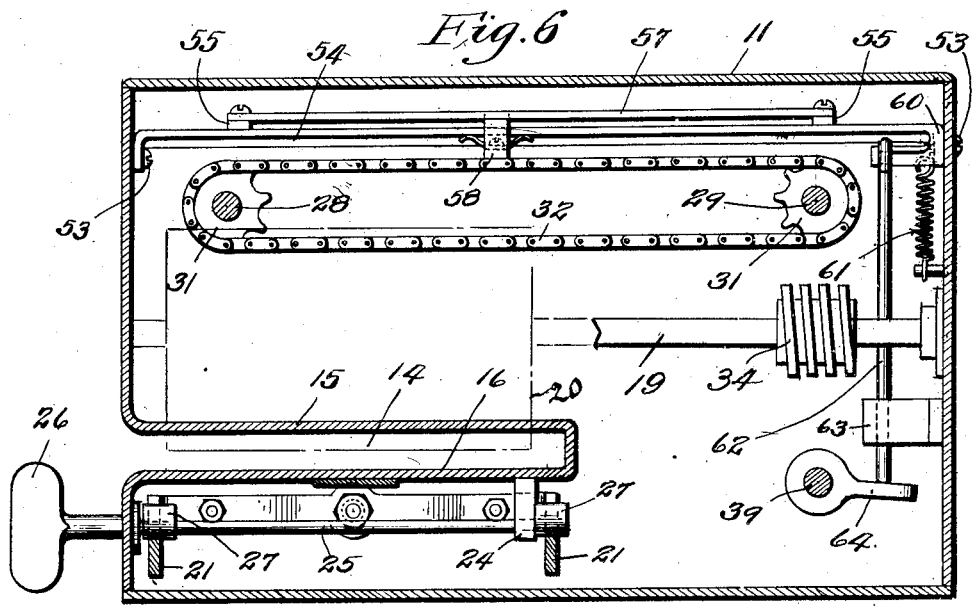
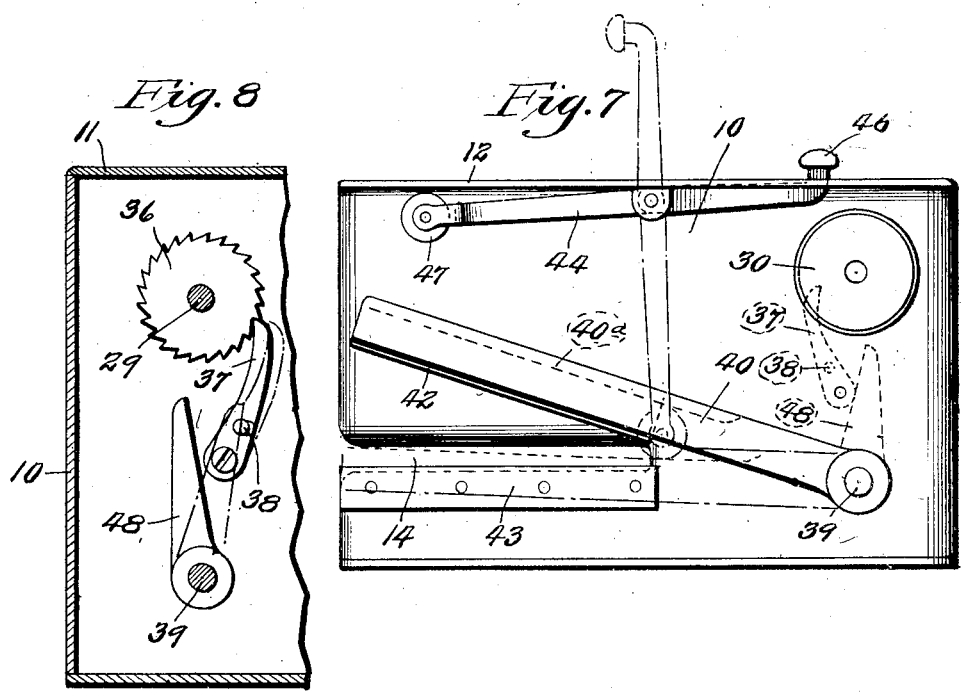
Inventor
Leo Ehrlich

UNITED STATES PATENT OFFICE.

LEO EHRLICH, OF ST. LOUIS, MISSOURI, ASSIGNOR OF ONE-HALF TO ARTHUR S. PARTRIDGE, OF ST. LOUIS, MISSOURI, AND ONE-HALF TO ALBERT BLAIR, OF ST. LOUIS, MISSOURI.

FABRIC-MEASURING AND COST-COMPUTING MACHINE.

1,339,748.   Specification of Letters Patent.   Patented May 11, 1920.

Application filed November 12, 1918. Serial No. 262,131.

*To all whom it may concern:*

Be it known that I, LEO EHRLICH, a citizen of the United States, residing at St. Louis, Missouri, have invented a certain new and useful Improvement in Fabric-Measuring and Cost-Computing Machines, of which the following is a full, clear, and exact description, such as will enable others skilled in the art to which it appertains to make and use the same, reference being had to the accompanying drawings, forming part of this specification.

My invention relates to a fabric measuring and cost computing machine, particularly of the type adapted for use in stores by salesmen, for measuring goods such as cloth, fabric, ribbon and the like, indicating in numbers the exact amount of the measured portion of the goods, computing the cost price or amount to be charged for said measured portion, said measuring indicating and computing operations being simultaneously accomplished as the fabric or other material is drawn through the machine, and said machine also performing the functions of a cash register inasmuch as it is equipped with means for marking or indicating on duplicate sales slips or tickets, the exact amount of goods drawn through and measured by the machine, and the amount of money to be charged for the measured piece of goods.

My present invention is an improvement upon the fabric measuring and cost computing machine disclosed in my copending application filed February 16, 1918, Serial No. 217,502.

The principal objects of my invention are, to generally improve upon and simplify the construction of the machine disclosed in my copending application; to provide a machine which is comparatively small, compact and readily adaptable for use on counters where goods are sold; to provide a machine having a relatively small number of gears and operating parts, thereby reducing to a minimum the liability of the machine becoming inoperative through failure of its parts to function properly and likewise minimizing the initial cost of manufacture, and the cost of repairs; to arrange the operating parts of the machine within a relatively dust and lint-proof housing; to provide a machine wherein the cost or price calculations are positively and accurately performed by mechanical means, thereby insuring accuracy and wholly eliminating the necessity for any calculations, mental or otherwise, upon the part of the clerk or person manipulating the instrument; and further, to provide for the registering or duplicate sales slips or tickets which are readily positioned within and removed from the machine, the exact amount of cash involved in each transaction, and likewise, the amount of goods measured and sold.

Still further objects of my invention are, to provide a fabric measuring and cost computing machine having a relatively large capacity so that pieces of goods of considerable length can be measured and the cost price thereof computed; to provide simple means for resetting the pointer or ticket marking member to zero position; to provide simple and effective means for locking parts of the measuring and indicating mechanism against reverse movement until the knife or other member of the machine has been actuated to cut the measured portion of the goods; to provide attachments which can be readily applied to or removed from the machine housing for the purpose of conveniently supporting bolts or small rolls of comparatively narrow material such as ribbon, when the same is being drawn through the machine; and further, to provide a machine of the type set forth which possesses superior advantages in points of simplicity, durability and general efficiency.

With the foregoing and other objects in view, my invention consists in certain novel features of construction and arrangement of parts, hereinafter more fully described and claimed, and illustrated in the accompanying drawings, in which—

Figure 1 is a plan view of a fabric measuring and cost computing machine of my improved construction, and showing the attachments thereupon for the support of a relatively narrow section of fabric.

Fig. 2 is a perspective view of one of the duplicate sales slips or tickets.

Fig. 3 is a horizontal section taken through the lower portion of the housing of the machine and showing the pressure roller which coöperates with the measuring roll or drum.

Fig. 4 is an enlarged vertical cross section taken approximately on the line 4—4 of Fig. 1.

Fig. 5 is an enlarged cross section taken approximately on the line 5—5 of Fig. 1.

Fig. 6 is an enlarged vertical section taken approximately on the line 6—6 of Fig. 1.

Fig. 7 is a side elevational view of the machine looking in the direction indicated by the arrow 7, Fig. 1.

Fig. 8 is a detail section taken approximately on the line 8—8 of Fig. 4.

Referring by numerals to the accompanying drawings, which illustrate a practical embodiment of my invention, 10 designates the machine housing which is a substantially box-like structure, preferably formed of sheet metal and having a removable top or cover plate 11, the righthand edge 12ª of which as viewed in Figs. 4 and 5 projects a slight distance beyond the righthand side wall of said housing.

Formed in the lefthand portion of the cover plate (see Fig. 1) is a longitudinally disposed opening which is closed by a section of glass 12 or analogous transparent material. Suitable supports 13 (see Fig. 4) are applied to the under side of the housing, said supports being preferably in the form of rubber suction disks which, when applied to a flat surface, such as the top of a counter or showcase, will engage said surface and retain the machine in fixed position thereupon.

A horizontally disposed opening 14 is formed through the lower front end portion of the housing and arranged above and below said opening are horizontally disposed plates 15 and 16 respectively, (see Fig. 5) said plates being secured to the front and side walls of the housing in any suitable manner. This opening 14 provides a passageway through which are drawn the goods measured by the machine.

Formed in the righthand portion of plate 15 is an opening 17, and formed in plate 16 immediately below this opening is an opening 18.

Journaled in suitable bearings arranged upon the front and rear end walls of the housing 10 and slightly to the right of the vertical center of the machine is a longitudinally disposed shaft 19, (see Figs. 5 and 6) the forward portion of which carries a measuring roller or drum 20, the same having a circumference of fixed or definite length. The lower portion of this measuring roller or drum projects through opening 17 in plate 15.

Hinged or loosely connected in any suitable manner to the front portion of the lefthand side wall of the housing 10 below plate 16 is a horizontally disposed substantially U-shaped frame 21, in the righthand end of which are journaled the trunnions of a longitudinally disposed pressure roller 22. The upper portion of this pressure roller projects through opening 18 and the periphery thereof normally bears directly against the periphery of measuring roller 20. This roller or the peripheral portion thereof may be formed of rubber, rubber composition, or any material which has a relatively high degree of friction with material such as fabric, when in contact therewith.

The periphery of the pressure roller is maintained in yielding contact with measuring roller 20 in any suitable manner, preferably by means of a spring 23, which latter is arranged in the lower portion of the housing and bears with pressure against the underside of frame 21 or a part carried thereby.

Journaled in the front end wall of the housing below plate 16 and in a bearing 24 depending from the rear portion of plate 16 is a shaft 25, the front portion of which projects through the front end wall of the housing and carries a knob or handle 26. Mounted on this shaft are eccentric disks 27 which bear directly on top of parts of the frame 21. These disks when swung downward by rocking movement imparted to shaft 25 force frame 21 carrying pressure roller 22 downwardly so that said pressure roller is wholly out of engagement with measuring roll 20, thus permitting the end of a piece of goods to be readily inserted through opening 14 at the beginning of the measuring operation.

Journaled for rotation in suitable bearings on the side walls of the housing adjacent to the front and rear end walls thereof are horizontally disposed shafts 28 and 29 (see Fig. 6). The righthand portion of rear shaft 29 (see Fig. 4) which is adjacent to the rear end wall of the housing projects through the righthand side wall of the housing and carries a disk or hand wheel 30, the latter providing means for manually imparting rotary movement to said shaft 29.

Mounted upon shafts 28 and 29 at or near their centers are relatively small sprocket wheels 31 and mounted for operation thereupon is a sprocket chain 32. The bearings 28ª (see Fig. 5) in which front shaft 28 is journaled are preferably adjustable in order that said shaft 28 can be moved away from shaft 29, thereby taking up any slack which may occur in sprocket chain 32.

Loosely mounted on shaft 29 is a worm wheel 33, the same engaging with a worm 34, the latter being fixed on shaft 19 which carries the measuring roller 20. Fixed upon shaft 29 adjacent to worm wheel 33 is a friction disk 35 through the medium of which, under normal conditions, the rotary motion of worm wheel 33 is transmitted to shaft 29 and parts carried thereby.

Fixed on shaft 29, preferably adjacent to the righthand side wall of the housing is a ratchet wheel 36 (see Figs. 4 and 8) with which engages the point of a spring-pressed pawl 37, the latter carrying a laterally projecting pin 38. Journaled in suitable bearings in the lower rear end portion of the housing 10 is a transversely disposed shaft 39, the righthand end of which projects through the corresponding wall of the housing and carries a forwardly and upwardly projecting arm or lever 40 (see Fig. 7).

A spring 41 is arranged upon shaft 39 between this arm and the housing, said spring being arranged so as to normally retain the free end of the arm in elevated position, as seen in Fig. 7. Carried by the front portion of this arm 40 is a blade 42, the latter being adapted to coöperate with a blade 43, to cut the edge of the goods drawn through the opening 14 at the termination of a measuring operation. This last mentioned blade 43 is fixed in any suitable manner to the housing 10 immediately below the righthand end of opening 14.

Fulcrumed in any suitable manner to the projecting edge 12$^a$ of plate 11 and at a point near the center thereof is a lever 44, the rear portion of which is adapted to operate through a slot 45 which is formed in said plate 11. The rear end of this lever carries a knob or button 46 and the forward end thereof carries a roller 47, which latter is adapted to traverse a groove 40$^a$ formed in the top of arm 40.

Fixed on shaft 39 within the housing is an upwardly projecting finger 48 which is adapted when shaft 39 is rocked, to make contact with pin 38 carried by pawl 37 and swing the latter so that its point is disengaged from the teeth of ratchet wheel 36.

Under normal conditions or with the arm 40 in elevated position, as illustrated in Fig. 7, the finger 48 is out of contact and spaced apart from pin 38, and consequently said finger must move a short distance before actuating pawl 37 to disengage the point thereof from the teeth of ratchet wheel 36. This action takes place during the latter portion of the downward movement of knife-carrying arm 40.

Formed in the upper portion of the left hand side wall of housing 10 is a relatively narrow longitudinally disposed opening 49 (see Fig. 4), and secured to the side wall and occupying the lower portion of this opening is a horizontally disposed plate or table 50, the same serving as a support for the sales tickets utilized in connection with my improved machine. Formed in the top of this plate 50 and preferably at a point below the central portion of the glazed opening 12 is a longitudinally disposed groove or slot 51.

Secured to the housing 10 and occupying a position immediately above the plate 50 and preferably immediately to the left hand side of slot 51 is a longitudinally disposed rail 52 which performs the functions of a retaining member or stripper for the sales ticket while the same is being marked or punctured, as hereinafter more fully described.

Pivotally mounted upon pins 53 (see Fig. 6) which are seated in the front and rear end walls of the housing are the ends of a longitudinally disposed rail 54, the same occupying a position immediately above the overrunning portion of chain 32. Fixed on top of said rail near its ends are blocks 55, the same being spaced a fixed or predetermined distance apart and secured to said blocks and disposed immediately above rail 54 is a rail 57. This arrangement provides a narrow slot between rails 54 and 55 and which slot extends from one block 55 to the other. Secured in any suitable manner to one of the links of chain 32 is the lower end of a pointer or finger 58, the same extending upwardly and thence laterally through the slot between the rails 54 and 57. The body portion of this pointer or finger overlies the inner portion of the plate or table 50 and said pointer or finger terminates in a small depending punch member 59 which is adapted to puncture the sales slip positioned on the plate 50 and in so doing to enter the slot 51 in said plate.

Secured to the rear end of rail 54 is a laterally projecting crank arm 60 (see Fig. 4) to which is secured the upper end of a depending retractile spring 61, the lower end thereof being secured in any suitable manner to the adjacent wall of the housing. Pivotally connected to the end of the crank arm 60 is the upper end of a push rod 62, the lower portion thereof operating through a fixed bearing 63 (Fig. 6), and the lower end of said rod normally resting on a finger 64 which is carried by and projects rearwardly from rock shaft 39.

The type of sales slip used in my improved machine is illustrated in Fig. 2, said sales slip being formed from a single rectangular sheet of paper or analogous material, the same being bent double to form duplicate slips or tickets A and B. A row of perforations C is formed along the line where the sheet of paper is bent, thereby permitting the two slips or tickets to be readily separated.

The upper face of each slip or ticket is printed with identical indicia, the same including the name of the firm or concern using the machine and tickets, a ticket number and headings such as, Sale No., Name, Address, Amount received, etc. Each ticket is also printed with a graduated scale D, the graduations thereof being consecutively numbered from zero to 10, 20 or 30 and representing the number of yards of goods measured in the machine.

Immediately adjacent this graduated scale D is a graduated scale E, the graduations thereof being numbered from zero upwardly, and representing the cost price of the goods measured in the machine. For instance:—The sales ticket illustrated in Fig. 2 is applicable for goods which are sold at ten cents (10¢) per yard and the ticket has a capacity of twenty yards which, at ten cents per yard, totals two dollars ($2.00). Obviously, where the machine is utilized for measuring and computing the cost of goods which are sold at different prices per yard, different forms of tickets must be supplied, that is, tickets having different price per yard scales.

Attachments adapted to draw relatively narrow strips of material such as ribbon through the machine and roll up the measured portion of the ribbon, include an angle bracket 65, one end of which is adapted to be inserted in a bearing 66 seated in the lefthand wall of the housing 10, the front portion of said angle bracket occupying a position in horizontal alinement with the opening 14 and adapted to receive a bolt of ribbon or the like.

Removably positioned in a bearing 67 located on the righthand wall of the housing is an outwardly projecting arm 68, the outer end of which is provided with a bearing 69 in which is journaled a shaft 70 carrying a relatively small winding drum 71. The forward end of shaft 70 is provided with a crank handle 72.

When ribbon or like material is drawn through the machine, the free end thereof is engaged on drum 71 and by manipulating crank handle 72, the ribbon is drawn through the machine, measured, and wound in a neat roll upon drum 71.

The operation of my improved machine is as follows:

At the beginning of a measuring operation it will be understood that finger or pointer 58 occupies a position immediately against the front one of blocks 55 so that when a duplicate sales ticket is positioned on plate 50, the zero graduations on said tickets are positioned immediately beneath the end of the pointer and which end carries the punch member 59. To insert the end of the goods to be measured in the machine, the operator engages handle 26 and rocks shaft 25 so as to swing eccentrics 27 downward, thereby swinging the free end of frame 21 downward and carrying pressure roll 22 away from measuring roller 20. The end portion of the goods to be measured is now inserted in opening 14 and the end of said goods is brought to the blade 43. Shaft 25 is now rocked to swing eccentrics 27 upwardly, thereby permitting frame 21 and roller 22 carried thereby to move upwardly under the force of spring 23 with the result that the goods is engaged between the pressure roller 22 and measuring roller 20.

The operator now pulls the goods through the machine with his right hand and with his left hand unwraps the goods from the bolt and guides said goods into opening 14. As this action takes place, measuring roller 20 is rotated and this rotary motion is transmitted through shaft 19, worm 34 and worm wheel 33 to shaft 29 and the rear one of sprocket wheels 31 carried thereby. As this sprocket wheel is rotated, sprocket chain 32 will be driven and the overrunning portion thereof will move toward the rear of the machine beneath rail 54, and pointer 58 carried by said chain will be carried rearwardly between said rail 54 and rail 57. Obviously as this movement takes place, the end of the pointer or finger will pass over the graduated scale D and the movement of the pointer along this scale can be readily observed through the glazed opening 12.

When the desired amount of goods has been drawn through the machine and which amount is indicated by the position of the finger 58 on the yardage scale, the operator to cut or mark the edge of goods to indicate the point where the same is to be severed, engages knob 46 on the rear end of lever 44 and pulls upwardly and forwardly on said knob, thereby swinging the lever into a substantially vertical position. As this movement takes place, roller 47 on the forward end of said lever engages in groove 40ᵃ in the top of arm 40 and swings the forward end of said arm downwardly with the result that the blade 42 coöperates with blade 43 to cut the edge of the goods, thus providing a mark in the form of a slit or notch which serves as a guide for the operator in cutting the measured portion of goods from the bolt.

As arm 40 is thus actuated, shaft 39 which carries said arm will be rocked and finger 64 will be swung upwardly, thereby pushing rod 62 upward, and through crank arm 60, bar 54 will be swung upon its pivot points. As this movement takes place, the free end of pointer 58 will be swung downward and the punch 59 on the free end thereof will puncture the duplicate sales tickets positioned on plate 50, the point of puncture occurring directly opposite the graduation on the cost price scale which is directly opposite the graduation which indicates the total amount of goods measured. The rocking movement thus imparted to finger 58 is relatively small and the flexibility of sprocket chain 32 readily permits such rocking movement.

During the final portion of the downward movement of blade carrying arm 40, finger 48 will engage pin 38 and swing the point of pawl 37 out of engagement with the teeth of ratchet wheel 36 and the operator now manually engages disk 30 and rotates shaft 29 so as to move pointer 58 back to zero position or into engagement with the front one of blocks 55.

It will be understood that when the operator manipulates lever 44 to swing arm 40 downward, said lever 44 is left in its vertical position, as shown by dotted lines in Fig. 7, until after the resetting operation has been accomplished. In this connection it will be understood that while pawl 37 is in engagement with the teeth of ratchet wheel 36 it is impossible to reset the pointer to zero position, and consequently it will be impossible for a dishonest employee operating with a confederate to measure in the machine a certain amount of goods, for instance, ten yards, and then by manipulating the resetting mechanism to run the pointer 58 backward upon the scale to indicate only a part of the goods actually measured.

After the pointer 58 has been reset to zero position, the operator releases lever 44 and swings the same into its normal position, thereby permitting blade carrying arm 40 to return to its normal position and after the duplicate sales ticket has been removed from the machine, the latter is ready for a succeeding operation.

The sales tickets are now separated along the perforated line C and one ticket delivered to the purchaser and the other to the cashier or proper employee in charge of sales.

Obviously, the sales ticket which is retained by the cashier or other employee will be of great assistance in keeping records of all transactions or sales made by a particular department, and likewise of all clerks or salesmen therein.

A fabric measuring and cost computing machine of my improved construction is comparatively simple, insures accuracy of measurement of all piece goods, makes an accurate record of each piece of measured goods and the cost price thereof, can be easily and cheaply manufactured, is very compact, and includes a comparatively small number of operating parts.

It will be readily understood that minor changes in the size, form and construction of the various parts of my fabric measuring and cost computing machine may be made and substituted for those herein shown and described, without departing from the spirit of my invention, the scope of which is set forth in the appended claims.

I claim:

1. In a machine of the class described, a support for a sales slip, a member mounted to cause a part of it to move in a path substantially parallel with said support, means actuated by goods drawn through the machine for imparting movement to said member, a pointer carried by said member and adapted to travel in a path above the sales slip located on said support and adapted when tilted to puncture said sales slip, means for cutting the edge of the material drawn through the machine, and means for actuating the cutting means and simultaneously actuating means to cause the pointer to puncture the sales slip.

2. In a machine of the class described, a support for a sales slip, a flexible member mounted to cause a part of it to travel in a path adjacent to said support, means actuated by goods drawn through the machine for imparting movement to said member, a pointer carried by said flexible member and adapted to move in a path above the sales slip support, and means for rocking said flexible member to cause the end of the pointer carried thereby to mark a sales slip positioned on the support.

3. In a machine of the class described, a support for a sales slip, a flexible member mounted to cause a part of it to travel in a path adjacent to said support, means actuated by goods drawn through the machine for imparting movement to said flexible member, a pointer carried by said flexible member and adapted to move in a path above the sales slip support, means for rocking said flexible member to cause the end of the pointer carried thereby to mark a sales slip positioned on the support, and means for actuating the flexible member to reset the pointer after a measuring and ticket marking operation.

4. In a machine of the class described, the combination with a movable member mounted for operation, of means adapted to be actuated by goods passing through the machine for imparting movement to said movable member, means including a sales ticket supported by the machine and ticket marking means carried by the movable member for registering the lineal measurement and the cost price of that portion of the goods drawn through the machine, manually operable means for cutting the edge of the goods in the machine, and means operated thereby for simultaneously operating said ticket marking means.

5. In a machine of the class described, the combination with a movable member mounted for operation, of means adapted to be actuated by goods passing through the machine for imparting movement to said movable member, means including a sales ticket supported by the machine and ticket marking means carried by the movable member for registering the lineal measurement and the cost price of that portion of the goods drawn through the machine, manually operable means for cutting the edge of the goods in the machine, means operated thereby for simultaneously operating said ticket marking means, and means for manually actuating the first mentioned member to reset the ticket marking means to home or zero position.

6. In a fabric measuring and cost computing machine, a support, a price ticket adapted to be removably positioned upon said support, said price ticket bearing a graduated scale, a carrier mounted for operation so that a part of it moves in a path substantially parallel with the graduated scale on the price ticket so positioned, operable means on said carrier for marking the price ticket positioned on said support, means adapted to be actuated by the goods drawn through the machine for imparting movement to said carrier, manually operated means for cutting the edge of the goods in the machine, and means operated by said cutting means for simultaneously operating the ticket marking means.

7. In a fabric measuring and cost computing machine, a support, a price ticket adapted to be removably positioned upon said support, said price ticket bearing a graduated scale, a carrier mounted for operation so that a part of it moves in a path substantially parallel with the graduated scale on the price ticket so positioned, operable means on said carrier for marking the price ticket positioned on said support, means adapted to be actuated by the goods drawn through the machine for imparting movement to said carrier, manually operated means for cutting the edge of the goods in the machine, means operated by said cutting means for simultaneously operating the ticket marking means, and means for actuating the carrier to reset the ticket marking means to zero position.

8. In a fabric measuring and cost computing machine, a support, a price ticket adapted to be removably positioned upon said support, said price ticket bearing a graduated scale, a carrier mounted for operation so that a part of it moves in a path substantially parallel with the graduated scale on the price ticket so positioned, operable means on said carrier for marking the price ticket positioned on said support, means adapted to be actuated by the goods drawn through the machine for imparting movement to said carrier, manually operated means for cutting the edge of the goods in the machine, means operated by said cutting means for simultaneously operating the ticket marking means, means for actuating the carrier to reset the ticket marking means to zero position, means for holding said resetting means normally inoperative, and means operated by said cutting means for releasing said holding means.

9. In a machine of the class described, a support for a sales slip, a flexible member mounted to cause a part of it to travel in a path adjacent to said support, means actuated by goods drawn through the machine for imparting movement to said flexible member, a pointer carried by said flexible member and adapted to travel in a path adjacent to the support, and manually operable means for imparting rocking movement to the flexible member to cause the end of the pointer to mark a sales slip positioned on the support.

10. In a machine of the class described, a member mounted for operation, means adapted to be actuated by goods drawn through the machine for imparting movement to said member, a pointer carried by said member, means for actuating said member to reset the pointer to zero position, means for normally holding the resetting means against operation, manually operable means for cutting the edge of the goods in the machine, and means adapted to be actuated by said cutting means for releasing said holding means.

11. In a machine of the class described, a support for a sales slip, a flexible member mounted to cause a part of it to travel in a path adjacent to said support, means adapted to be actuated by goods drawn through the machine for imparting movement to said flexible member, a pointer carried by said flexible member and adapted to travel in a path adjacent to said support, and means for imparting tilting movement to the pointer at any point in its travel so as to move the end thereof toward the support to mark a sales slip thereon.

12. In a machine of the class described, a support for a sales slip, which support is provided with a longitudinally disposed groove, a member mounted so as to cause a part of it to travel in a path adjacent to said support, means adapted to be actuated by goods drawn through the machine for imparting movement to said member, a pointer carried by said member and adapted to travel in a path adjacent to the support, and means for tilting said pointer to move a portion thereof into the groove in the support to mark a sales slip thereon.

13. In a machine of the class described, a support for a sales slip, a member mounted to cause a part of it to travel in a path adjacent to said support, means actuated by goods drawn through the machine for imparting movement to said member, a pointer carried by said member and adapted to travel in a path adjacent to the support, and a bar mounted for rocking movement and serving as a support for the pointer during its movement, means for rocking said bar so as to tilt said pointer and move a portion thereof toward the sales slip support to mark a sales slip thereon.

14. In a machine of the class described, a support for a sales slip, a member mounted to cause a part of it to travel in a path adjacent to said support, means actuated by goods drawn through the machine for imparting movement to said member, a pointer carried by said member and adapted to travel in a path adjacent to the support, a rocking member with which the pointer engages during its movement, and manually operable means for actuating said rocking member.

15. In a machine of the class described, a support for a sales ticket, a member mounted to travel in a path adjacent to said support, means actuated by goods drawn through the machine for imparting movement to said member, guiding means for said member, which guiding means is disposed adjacent to the sales slip, a pointer carried by said member and adapted to travel in a path adjacent to the sales slip support, and means for rocking said guiding member and tilting the pointer toward the sales slip support to mark a sales slip thereon.

16. In a machine of the class described, a housing provided with an opening, a support for a sales ticket arranged in the housing adjacent to said opening, means arranged to travel in a path adjacent to said support, a combined pointer and ticket marking member carried by said traveling means, means adapted to be actuated by goods drawn through the machine for imparting movement to said traveling means, and means for tilting the combined pointer and marking member to mark a ticket positioned on said support.

17. In a machine of the class described a support for a sales slip, a member mounted to cause a part of it to travel in a path adjacent to said support, means actuated by goods drawn through the machine for imparting movement to said member, a pointer carried by said member and adapted to travel in a path adjacent to the support, manually operable means for imparting tilting movement to the pointer and moving the same toward the sales slip support to mark a sales slip positioned thereupon, and manually operable means for actuating said member to return the pointer to zero position.

18. In a fabric measuring and cost computing machine, a measuring roller adapted to be engaged by goods drawn through the machine, a support for a sales ticket, a carrier mounted for operation within the machine and arranged to travel in a path adjacent to said support, driving connections from the measuring roller to said carrier, means on said carrier and adapted when actuated to mark a sales ticket positioned on the support, means for cutting the edge of the goods in the machine, and means for simultaneously operating said cutting means and the ticket marking means.

19. In a fabric measuring and cost computing machine, a measuring roller adapted to be engaged by goods drawn through the machine, a support for a sales ticket, a carrier mounted for operation within the machine and arranged to travel in a path adjacent to said support, driving connections from the measuring roller to said carrier, means on said carrier and adapted when actuated to mark a sales ticket positioned on the support, means for cutting the edge of the goods in the machine, means for simultaneously operating said cutting means and the ticket marking means, and manually operable means for actuating the carrier to return the ticket marking means to home position.

In testimony whereof I hereunto affix my signature this 6th day of November, 1918.

LEO EHRLICH.